United States Patent
Streng

(10) Patent No.: US 9,108,673 B2
(45) Date of Patent: Aug. 18, 2015

(54) CRASH RELEASE MECHANISM FOR AUTOMOTIVE STEERING COLUMN

(71) Applicant: STEERING SOLUTIONS IP HOLDING CORPORATION, Saginaw, MI (US)

(72) Inventor: Joseph R. Streng, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 14/208,412

(22) Filed: Mar. 13, 2014

(65) Prior Publication Data

US 2014/0260762 A1   Sep. 18, 2014

Related U.S. Application Data

(60) Provisional application No. 61/792,833, filed on Mar. 15, 2013.

(51) Int. Cl.
    *B62D 1/18*    (2006.01)
    *B62D 1/19*    (2006.01)
    *B62D 1/184*   (2006.01)

(52) U.S. Cl.
    CPC ............. *B62D 1/195* (2013.01); *B62D 1/184* (2013.01)

(58) Field of Classification Search
    CPC ........... B62D 1/18; B62D 1/184; B62D 1/195
    USPC .............................. 280/777, 775; 74/492, 493
    See application file for complete search history.

(56) References Cited

U.S. PATENT DOCUMENTS

| 4,541,298 | A   | * | 9/1985  | Strutt ............................... 74/493 |
| 6,139,057 | A   | * | 10/2000 | Olgren et al. ................... 74/493 |
| 6,616,185 | B2  |   | 9/2003  | Manwaring et al. |
| 7,510,213 | B2  | * | 3/2009  | Manwaring et al. .......... 280/777 |
| 7,665,767 | B2  | * | 2/2010  | Olgren et al. .................. 280/777 |
| 7,861,615 | B2  | * | 1/2011  | Harris et al. ..................... 74/493 |
| 8,375,822 | B2  | * | 2/2013  | Ridgway et al. ................ 74/493 |
| 2003/0057694 | A1 | * | 3/2003  | Manwaring et al. .......... 280/775 |
| 2006/0207379 | A1 | * | 9/2006  | Riefe et al. ...................... 74/492 |
| 2006/0273568 | A1 | * | 12/2006 | Manwaring et al. .......... 280/777 |
| 2009/0218800 | A1 | * | 9/2009  | Rouleau et al. ............... 280/775 |
| 2010/0300237 | A1 |   | 12/2010 | Ridgway et al. |
| 2010/0300238 | A1 | * | 12/2010 | Ridgway et al. ................ 74/493 |
| 2011/0088501 | A1 | * | 4/2011  | Park ................................ 74/493 |
| 2011/0185839 | A1 | * | 8/2011  | Inoue .............................. 74/493 |
| 2011/0210537 | A1 | * | 9/2011  | Uesaka .......................... 280/775 |
| 2012/0125139 | A1 | * | 5/2012  | Tinnin et al. .................... 74/493 |

* cited by examiner

*Primary Examiner* — Joseph Rocca
*Assistant Examiner* — Robert A Coker
(74) *Attorney, Agent, or Firm* — Cantor Colburn LLP

(57) ABSTRACT

An adjustable steering column for a vehicle is provided. The adjustable steering column includes a mounting bracket configured to be secured to an adjacent vehicle component, a compression bracket movably positioned relative to the mounting bracket, and a column jacket extending along a first axis and having an upper jacket and a lower jacket telescopically coupled to one another. The adjustable steering column further includes a locking mechanism movable between a locked position and an unlocked position configured to selectively restrict adjustment of the upper jacket in a telescope direction, and at least one release mechanism configured to allow telescoping movement of the upper jacket with the locking mechanism in the locked position in response to an excessive axial force applied to the column jacket. At least one energy absorbing mechanism is configured to absorb energy during telescoping movement of the upper jacket with the locking mechanism in the locked position.

14 Claims, 7 Drawing Sheets

CRASH RELEASE MECHANISM FOR AUTOMOTIVE STEERING COLUMN

CROSS-REFERENCES TO RELATED APPLICATIONS

This patent application claims priority to U.S. Provisional Patent Application Ser. No. 61/792,833, filed Mar. 15, 2013 which is incorporated herein by reference in its entirety.

BACKGROUND OF THE INVENTION

The following description relates to an adjustable steering column, and in particular, a release mechanism in an adjustable steering column.

A steering column may be adjustable in rake and telescope directions. In normal operation, the adjustable steering column is mounted in the vehicle and is selectively adjustable based on a locking condition. In a locked condition, the steering column must sufficiently resist movement or adjustment from a selected position and behave as a stiff extension of an interior vehicle structure. In an unlocked condition, the steering column may be freely adjusted by an operator in the rake and telescope directions.

In high-impact or crash scenarios, it is beneficial for the steering column to collapse, partially or fully, from its mounting position in an axial direction to absorb energy. A release mechanism may be provided to transition the steering column from a mounted, adjustable condition during normal operation to an energy absorbing condition during a high-impact or crash scenario.

To secure a steering column against adjustment by an operator, an upper jacket of the steering column is ultimately locked relative to the vehicle structure in a desired position. The upper jacket may be directly locked relative to the vehicle structure, or locked to a lower jacket section for added stiffness. The upper jacket is typically locked into place by a clamping force applied across the steering column. However, in such a configuration, a crash resistance force is coupled with the clamping force between the upper and lower jackets. Thus, the crash resistance force may be difficult to control.

Accordingly, it is desirable to decouple the crash resistance force mechanism from the clamp force mechanism to obtain better tuning of energy absorbing characteristics.

SUMMARY OF THE INVENTION

According to an exemplary embodiment of the present invention, there is provided an adjustable steering column for a vehicle, the adjustable steering column having a mounting bracket configured to be secured to an adjacent vehicle component, the mounting bracket having a first leg and a second leg, a compression bracket extending between the first leg and the second leg and movably positioned relative to the mounting bracket, and a column jacket extending along a first axis and including an upper jacket and a lower jacket telescopically coupled to one another, the column jacket adjustable in a telescope direction and a rake direction. The steering column further includes a locking mechanism movable between a locked position and an unlocked position configured to selectively restrict adjustment of the upper jacket in a telescope direction relative to the lower jacket, at least one release mechanism configured to allow telescoping movement of the upper jacket relative to the lower jacket with the locking mechanism in the locked position in response to an axial force applied to the column jacket that exceeds a predetermined force, and at least one energy absorbing mechanism configured to absorb energy during telescoping movement of the upper jacket relative to the lower jacket with the locking mechanism in the locked position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
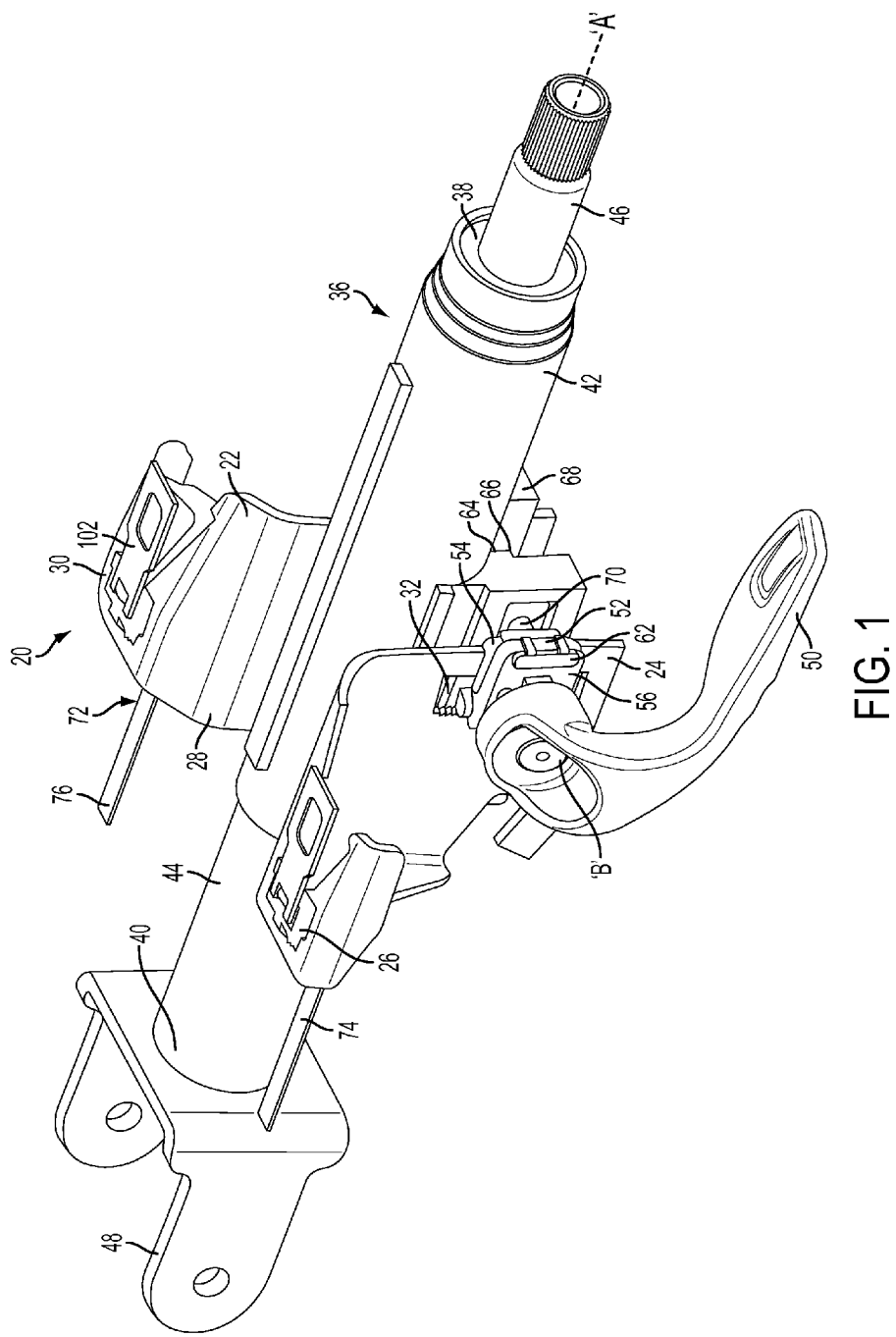
FIG. 1 is a perspective view of an adjustable steering column according to an exemplary embodiment of the present invention.

Referring now to the Figures, where the invention will be described with reference to specific embodiments, without limiting same, FIG. 1 shows a perspective view of an adjustable steering column 20 according to an exemplary embodiment of the present invention. The adjustable steering column 20 includes two operating conditions: an adjustment condition and an energy absorbing condition.

Figure 2:
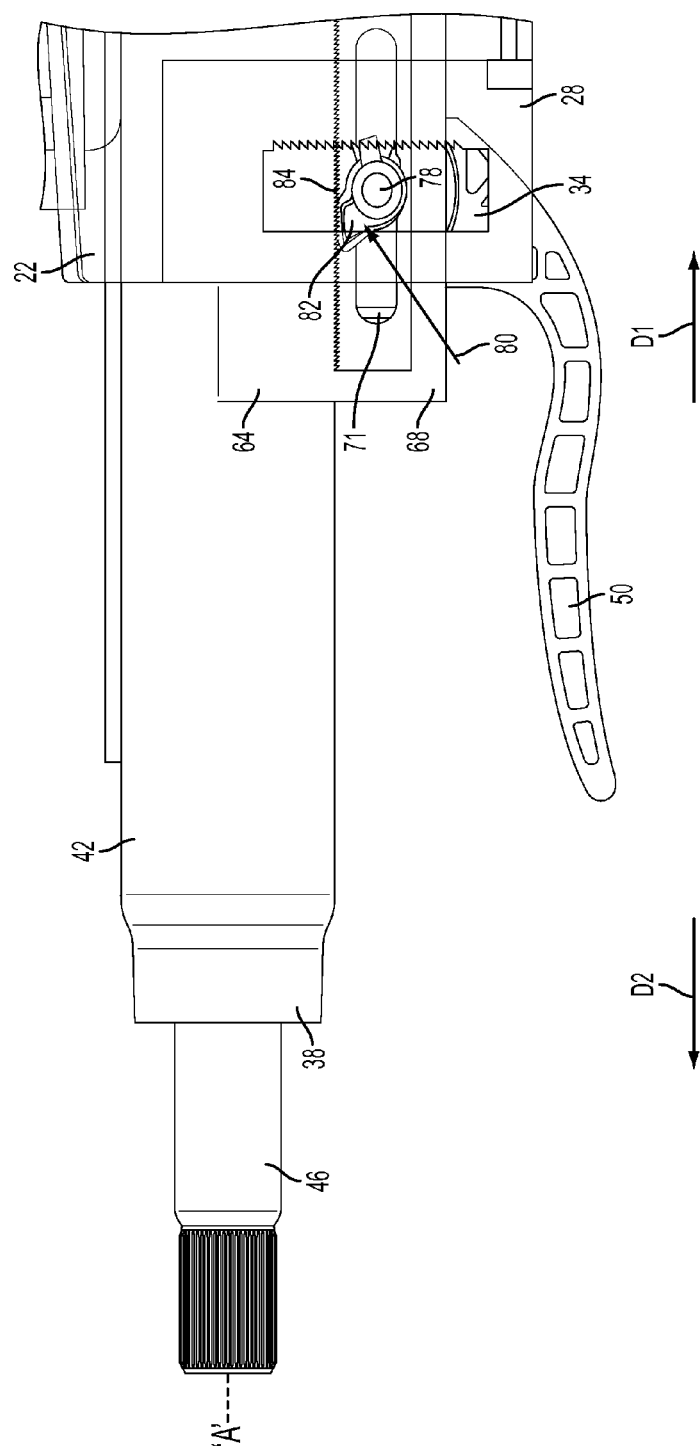
FIG. 2 is a side view of an adjustable steering column showing a locking mechanism according to an exemplary embodiment of the present invention.

Referring to FIG. 1, the adjustable steering column includes a mounting bracket 22 configured secure the adjustable steering column in a vehicle. In an exemplary embodiment, the mounting bracket 22 includes a first leg 24 having a first mounting flange 26 extending therefrom, and a second leg 28 having a second mounting flange 30 extending therefrom. The first and second mounting flanges 26, are configured to be secured to an adjacent vehicle component. The first leg 24 includes a first rake slot 32 formed therein, extending in a rake direction. The second leg 28 includes a second rake slot 34 (FIG. 2).

The adjustable steering column further includes a column jacket 36 extending along a first axis 'A' between the first leg 24 and second leg 28. The column jacket 36 has a first end 38 and a second end 40, and includes an upper jacket 42 and a lower jacket 44, telescopically coupled to one another. In an exemplary embodiment, the upper jacket 42 telescopically receives the lower jacket 44 and is adjustable in the telescope direction by stroking relative to the lower jacket 44. A steering shaft 46 extends within the column jacket 36 along the first axis 'A' and projects from the first end 38 of the column jacket 36. The steering shaft 46 is configured to have a steering wheel (not shown) attached thereto. The lower jacket 44 is configured to be secured an adjacent vehicle component via a jacket bracket 48 fixed at the second end 40 of the column jacket 36. The jacket bracket 48 may be secured directly to the lower jacket 44. An operating lever 50 is rotatable on a second axis 'B'.

The steering column 20 further comprises at least one release mechanism 52. In an exemplary embodiment, a release mechanism 52 is positioned adjacent to the first leg 24 of the mounting bracket 22. In the exemplary embodiment shown in FIG. 1, the release mechanism 52 is positioned between the operating lever 50, and the first leg 24, and the second axis 'B' extends through the release mechanism 52. It is understood however that the release mechanism may be positioned elsewhere in the steering column 20, for example, adjacent to the second leg 28, and that multiple release mechanisms may be utilized, for example adjacent to each leg 24, 28. The release mechanism 52 includes an inner wedge 54 secured to the first leg 24 and an outer wedge 56 abutting the inner wedge 54. The inner wedge 54 includes an inner wedge angled contact surface 58 (FIGS. 3 and 4) and the outer wedge 56 includes an outer wedge angled contact surface 60 (FIGS. 3 and 4) in butting relation to the inner wedge angled contact surface 58. A retainer 62 is secured to the outer wedge 56 and abuts the inner wedge 54. The release mechanism 52 operates to switch the steering column 20 from the adjustment condition to the energy absorbing condition as described further below.

The adjustable steering column 20 further comprises a compression bracket 64. The compression bracket 64 may be fixed secured to the upper jacket 42, or, formed integrally therewith. The compression bracket 64 includes first inner leg 66 and a second inner leg 68. The first inner leg 66 includes a first telescope slot 70 and the second inner leg 68 includes a second telescope slot 71 (FIG. 2)

With further reference to FIG. 1, the adjustable steering column 20 also includes at least one energy absorbing (E/A) mechanism 72. In an exemplary embodiment, the at least one E/A mechanism includes a first E/A strap 74 connected to the first mounting flange 26 and a second E/A strap 76 connected to the second mounting flange 30. The E/A straps 74, 76 are configured to provide resistance against movement of the mounting bracket 22 in the telescope direction when the steering column 20 is in an energy absorbing condition during a high-impact or crash scenario, as is described further below.

FIG. 2 is a side view of an adjustable steering column 20 showing a locking mechanism according to an exemplary embodiment of the present invention. With reference to FIG. 2, the adjustable steering column 20 further includes a rake bolt 78 extending along the second axis 'B' and rotatable thereon. The operating lever 50 is operably connected to the rake bolt 78. The rake bolt 78 rotates in response to rotation of the operating lever 50.

The adjustable steering column 20 further includes a locking mechanism 80. In an exemplary embodiment, the locking mechanism 80 includes a lock body 82 positioned on, and rotatable with the rake bolt 78 between locked and unlocked positions. In an exemplary embodiment, the lock body 82 is formed as an eccentric lock body. The locking mechanism 80 also includes a corresponding locking segment 84 positioned on the compression bracket 64. The lock body 82 is rotatable by the rake bolt 78 into and out of locking engagement with the locking segment 84. In the adjustment condition, when the lock body 82 lockingly engages the locking segment 84, i.e., is in the locked position, adjustment of the upper jacket 42 relative to the lower jacket 44 in the telescope direction is restricted. In the unlocked position, adjustment is permitted. Thus, with the lock body 82 lockingly engaging the locking segment 84, the steering column 20 is a locked condition.

In an exemplary embodiment, the lock body 82 includes a plurality of body teeth positioned thereon. The locking segment 84 includes a plurality of correspondingly sized and shaped segment teeth. When the lock body 82 is rotated to lockingly engage the locking segment 84, the body teeth engage between the segment teeth of the locking segment.

In an exemplary embodiment, the adjustable steering column 20 includes two release mechanisms 52. However, it is understood that the present invention may be configured with a single release mechanism 52. In an exemplary embodiment, each release mechanism 52 is positioned adjacent to a leg 24, 28 of the mounting bracket 22. Each release mechanism 52 is similarly constructed. However, in the exemplary embodiment where two release mechanisms 52 are provided, the release mechanisms 52 may be oppositely formed as mirror images of one another. That is, each release mechanism 52 includes the same components, however, the components may be oppositely arranged on opposing sides of the first axis 'A'.

Figure 3:
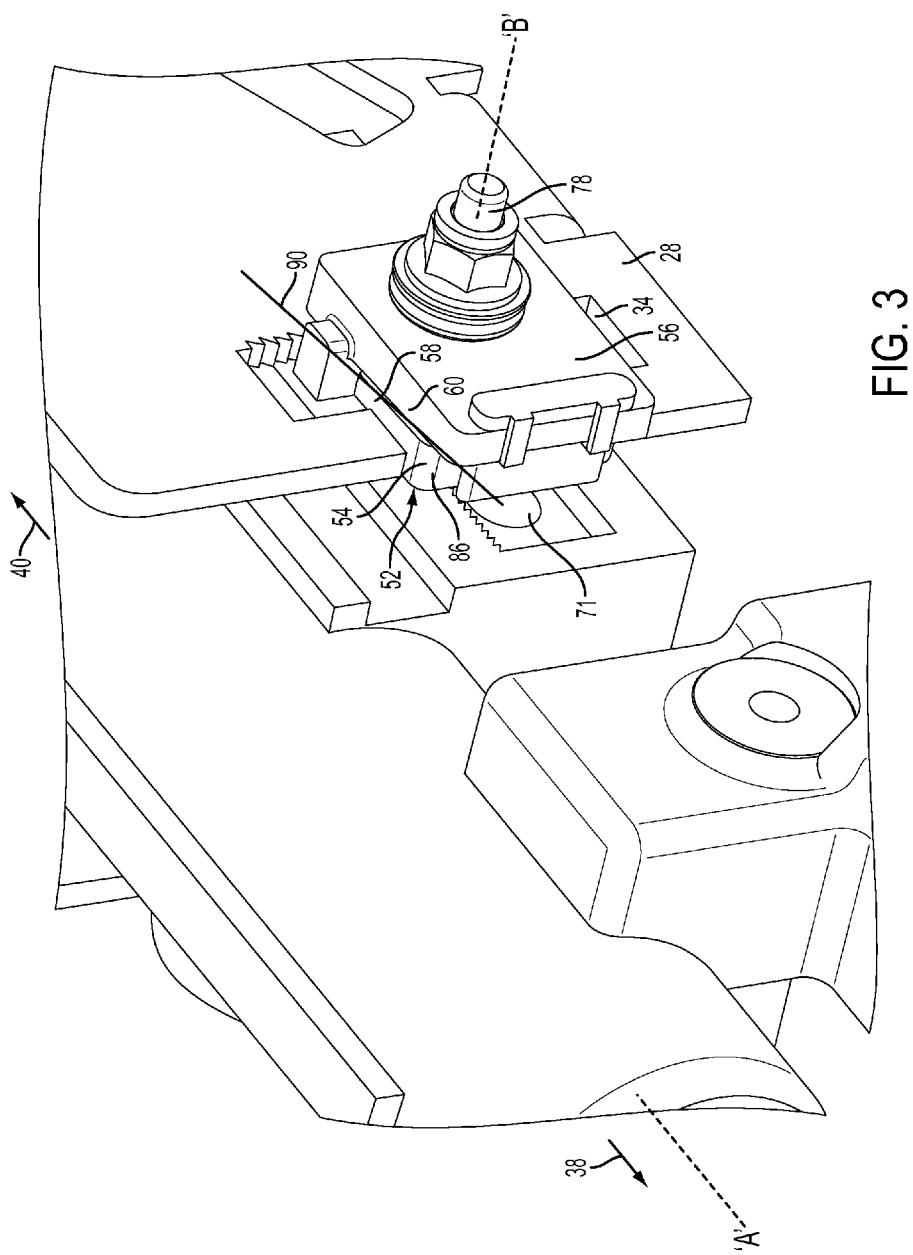
FIG. 3 is a perspective view of a release mechanism in an adjustable steering column according to an exemplary embodiment of the present invention.
Figure 4:
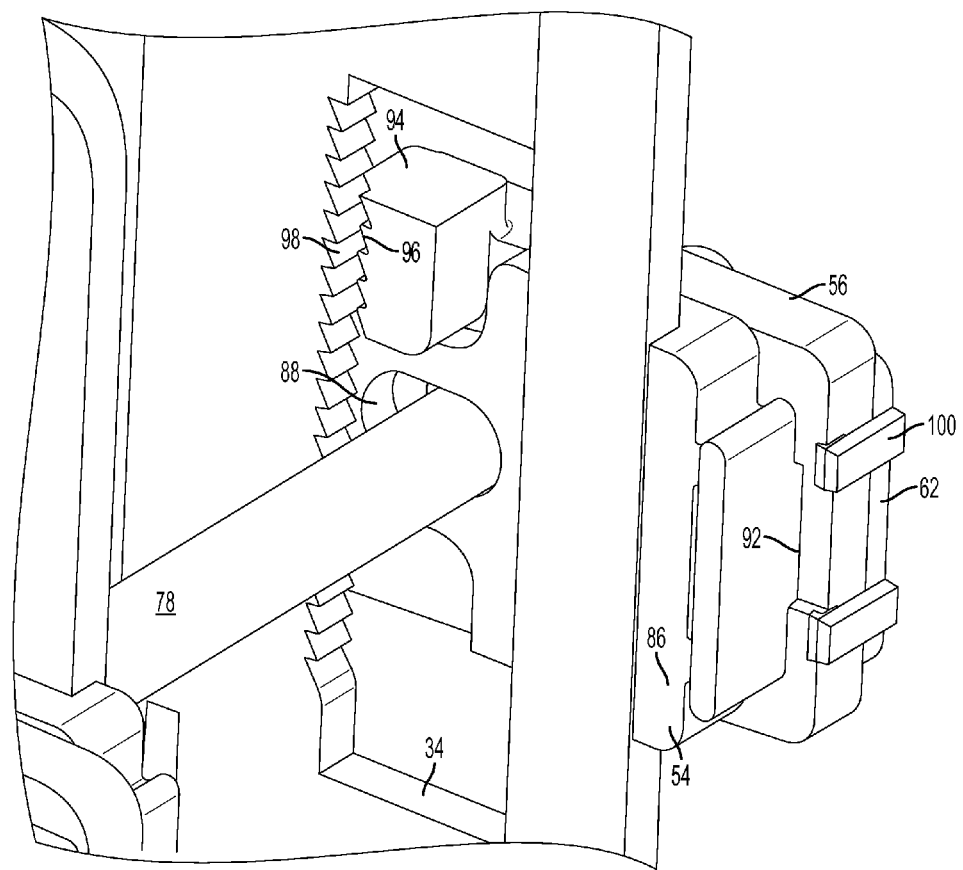
FIG. 4 is an inner perspective view of a release mechanism in an adjustable steering column according to an exemplary embodiment of the present invention.

FIG. 3 is a perspective view of a release mechanism 52 according to an exemplary embodiment of the present invention and FIG. 4 is an inner perspective view of the release mechanism 52 according to an exemplary embodiment of the present invention. Referring to FIGS. 3 and 4, the release mechanism is shown positioned adjacent to the second leg 28 of the mounting bracket 22. As detailed above, this release mechanism 52 may be the only release mechanism in the steering column or may be used in conjunction with another release mechanism, positioned, for example, adjacent to the first leg 24 as described above.

In an exemplary embodiment, the inner wedge 54 is positioned in abutting relationship with a leg 24, 28 of the mounting bracket. For example, with reference to FIGS. 3 and 4, the inner wedge 54 is position so that it abuts the second leg 28. The inner wedge 54 is secured against movement toward the second end 40 of the column jacket 36 by projection 86 extending partially around the second leg 28 in the direction of second axis 'B'. The inner wedge 54 also includes an elongated slot 88 through which the rake bolt 78 extends. The inner wedge angled contact surface 58 is angled such that it extends in a direction that converges toward the first axis 'A' in a direction from the first end 38 to the second end 40.

Referring still to FIGS. 3 and 4, the outer wedge 56 is non-rotatable coupled to the rake bolt 78. The rake bolt 78 may rotate relative to the outer wedge 56 on the second axis 'B'. However, the outer wedge 56 is configured to move with the rake bolt 78 in a telescope direction as described further below. The outer wedge angled contact surface 60 is configured to abut the inner wedge angled contact surface 58. The outer wedge angled contact surface 60 is angled such that is extends in a direction that converges toward the first axis 'A' in a direction from the first end 38 to the second end 40. Accordingly, a contact line 90 (see FIG. 3) may be formed between the inner wedge angled contact surface 58 and outer wedge angled contact surface 60 that converges toward the first axis 'A' in a direction from the first end 38 to the second 40.

The outer wedge 56 also includes an opening 92 through which the retainer 62 extends. In addition, the outer wedge 56 includes an impact rake lock extension 94, extending in a direction of the second axis 'B' into the second rake slot 34. It is understood that a release mechanism 52 positioned adjacent to the first leg 24 includes an outer wedge 56 having an impact rake lock extension 94 that extends into the first rake slot 32. In an exemplary embodiment, the impact rake lock extension 94 includes a plurality of extension lock teeth 96. Each rake slot 32, 34 includes a plurality of rake lock teeth 98 configured to engage between the extension lock teeth 96 to lock the steering column against movement in the rake direction in the energy absorbing condition during a high-impact or crash scenario.

The retainer 62 extends through the opening 92 of the outer wedge 56 and abuts against a surface on the inner wedge 54. The retainer 62 may also include a plurality of securing legs 100 configured to engage the outer wedge 56 to maintain a position of the retainer 62 relative to the outer wedge 56. In an exemplary embodiment, the securing legs 100 snap fit around a portion of the outer wedge 56. The retainer is configured to break away in response to an axial force that exceeds a predetermined force.

As described further below, an axial force applied to the steering column, and in particular, the column jacket 36, is transmitted to the rake bolt 78 and outer wedge 56 via the locking mechanism 80. Thus, the outer wedge 56 applies a first force to the retainer 62 in a first direction toward the second end 40, and the inner wedge 54 applies a second force, i.e., a reaction force, in a second direction toward the first end 38. The first force and second force are spaced from one another along the second axis 'B'. When the axial force exceeds a predetermined force, the first force and second force cause the retainer 62 to break away, thereby allowing the outer wedge 56 to move in the first direction, toward the second end 40, relative to the inner wedge 54.

Figure 5:
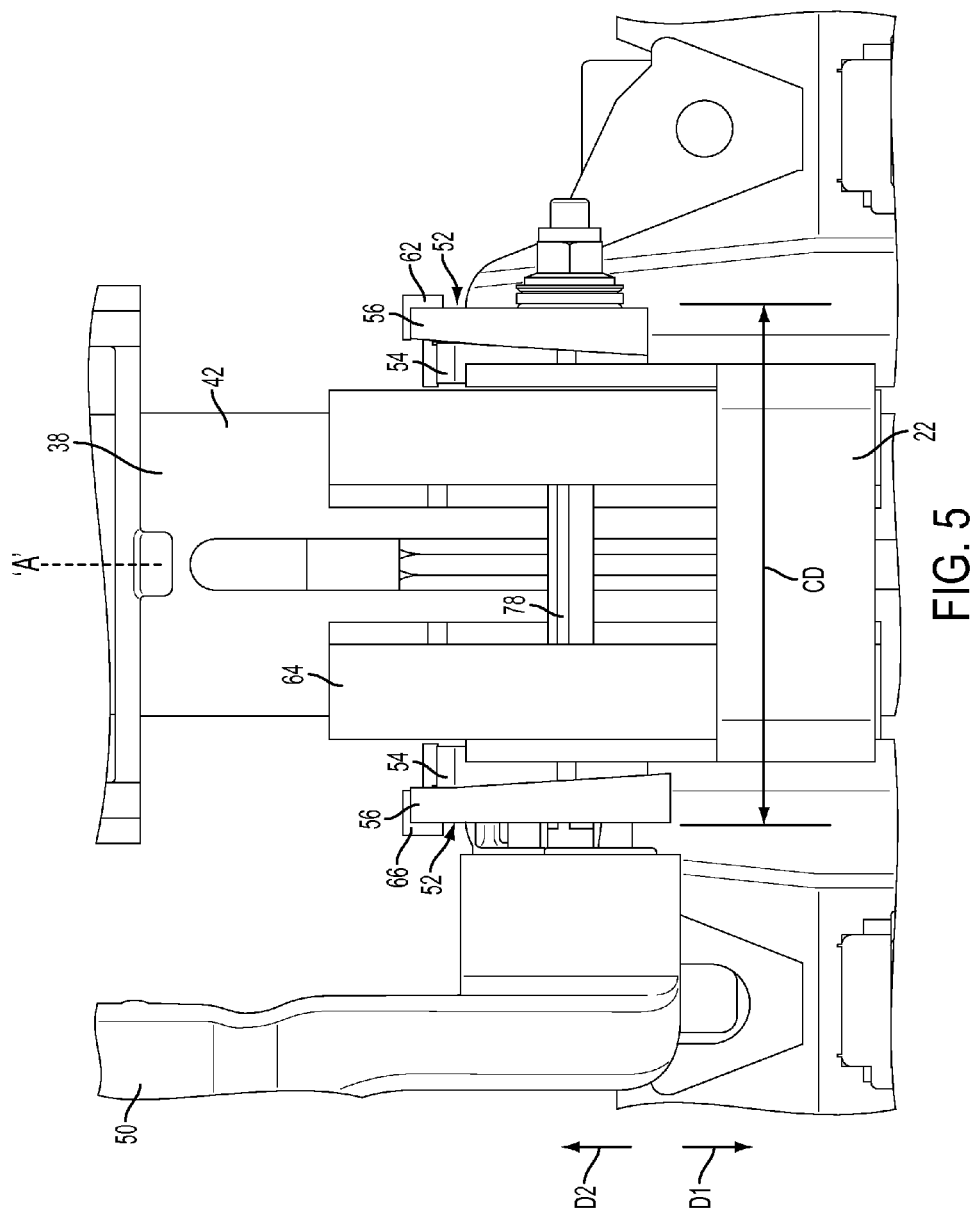
FIG. 5 is a bottom view of an adjustable steering column according to an exemplary embodiment of the present invention.

FIG. 5 is a bottom view of the adjustable steering column 20 according to an exemplary embodiment of the present invention. With reference to FIG. 5, the adjustable steering column 20 may include two release mechanisms 52 oppositely positioned on the rake bolt 78. In an exemplary embodiment, one release mechanism is positioned at an outer side of the first leg 24 and another release mechanism 52 is positioned at an outer side of the second leg 28. In an exemplary embodiment, a clamping distance 'CD' is formed between respective outer surfaces of the outer wedges 56. It is understood that the clamping distance CD could be measured between an outer surface of an outer wedge 56 and other reference points as well. In an exemplary embodiment, the outer surface of the outer wedge 56 refers to the surface on an opposite side of the outer wedge 56 from the outer wedge angled contact surface 60, i.e., a surface facing generally away from the first axis 'A'.

With the steering column 20 in the adjustable condition, and locked against adjustment, a first clamping distance is formed between the respective outer surfaces of the outer wedges 56. In addition, in the adjustable condition, and locked against adjustment, a first clamping force is applied along the second axis 'B' to the release mechanisms 52, first and second legs 24, 28 of the mounting bracket 22, first and second inner legs 66, 68 of the compression bracket 64, and the upper and lower jackets 42, 44, to assist in hold the steering column against adjustment. The first clamping force is applied and released in response to rotation of the operating lever 50 in opposite directions. The steering column 20 is adjustable when the first clamping force is released.

In a high-impact or crash scenario, where an axial force applied to the column jacket 36 exceeds a predetermined force, and the steering column 20 switches from the adjustable condition to the energy absorbing condition, the retainer 62 breaks away, and the outer wedge 56 move forward in vehicle, in the first direction D1 toward the second end 40. The outer wedge 56 move together with the upper jacket 42, compression bracket 64 and rake bolt 78 relative to the inner wedges 54 and mounting bracket 22 until the respective impact rake lock extensions 94 of the outer wedges 56 engage the rake lock teeth 98 of the respective rake slots 32, 34. The relative movement of the outer wedges 56 to the inner wedges 54 in the first direction D1 reduces the clamping distance. That is, in the energy absorbing condition, with the impact rake lock extensions 94 engaging the rake lock teeth 98, a second clamping distance is formed between the outer surfaces of the respective outer wedges 56 that is less than the first clamp distance. The clamping distance CD is reduced as result of the relative movement between the inner wedge angled contact surface 58 and the outer wedge angled contact surface 60. The reduced second clamping distance results in a second clamping force that is less than the first clamping force.

In the energy absorbing condition, the respective rake lock extensions 94 engage the rake lock teeth 98 in respective rake locks 32, 34. The applied axial force causes the mounting bracket 22 to decouple from the adjacent vehicle structure at the first and second mounting flanges 26, 30. In an exemplary embodiment, break away capsules 102 (FIG. 1) are used in securing the mounting bracket 22 to the adjacent vehicle components. The capsules 102 break away upon application of a predetermined force, allowing the mounting bracket 22 to move forward in the vehicle, i.e., in the first direction against a resistance provided by the E/A straps 74, 76. Thus, the E/A straps 74, 76 may absorb a portion of the energy within the steering column and aid in controlling a collapse of the steering column 20 in a high-impact or crash scenario.

In operation, the steering column 20 is normally in the adjustable condition. In the adjustable condition, the operative lever may be rotated in one direction to release a first clamping force along the second axis 'B' and to move the lock body 82 out of locking engagement with the locking segment 84 secured on the compression bracket 64. In this unlocked condition, the steering column may be adjusted by an operator to a desired position. For example, the operator may move the upper jacket 42 telescopically relative to the lower jacket 44. The upper jacket 42 moves together with the compression bracket 64 relative to the mounting bracket 22 and rake bolt 78.

To secure that steering column against adjustment, the operator rotates the operating lever 50 in an opposite direction. The lock body 82 rotates together with the rake bolt 78 and moves into locking engagement with the locking segment 84, thereby restricting telescope adjustment. In addition, rotation of the operating lever 50 causes the first clamping force to be applied to along the rake bolt 78 and second axis 'B'. The first clamping force may be applied by a clamping mechanism, such as a cam, operably connected to the operating lever 50. The first clamping force restricts adjustment of the steering column in the rake direction, and in particular restricts movement of the compression bracket 64 relative to the mounting bracket 22. In addition, the first clamping force also further restricts telescoping movement between the upper jacket 42 and lower jacket 44.

In a high-impact or crash scenario, the steering column may switch from the adjustable condition to the energy absorbing condition. In the high-impact or crash scenario, an axial force may be applied on the steering column, and in particular, to the column jacket 36 along the first axis 'A'. The axial force is applied to the upper jacket 42 and is transmitted to the compression bracket 64, and the locking segment 84 secured thereto. With the steering column in locked condition, the locking segment 84 and lock body 82 are lockingly engaged. Accordingly, the applied axial force is transmitted to the lock body 82, and then to the rake bolt 78 and outer wedge 56. The outer wedge 56 then transmits the axial force as a first force in the first direction D1 on the retainer 62. In turn, a second force, i.e., a reaction force, is applied in the second direction D2, opposite to the first direction, to the retainer 62 by the inner wedge 54.

If the axial force exceeds a predetermined force, then the first and second forces applied to the retainer 62 will cause the retainer 62 to break away. With the retainer 62 broken away, the outer wedge 56 is moves in the first direction D1 relative to the inner wedge 54. The outer wedge 56 moves together with the rake bolt 78, lock body 82, locking segment 84, compression bracket 64 and upper jacket 42 under the applied axial force and against a resistance between the upper jacket 42 and lower jacket 44 resulting from the first clamping force. The rake bolt 78 moves in the elongated slot 88 of the inner wedge 54.

The outer wedge 56 moves relative to the inner wedge 54 in the first direction until the impact rake lock extension 94 and the extension lock teeth 96 thereon engage between the rake lock teeth 98 formed in the rake slots 32, 34. Here, the clamping distance CD along the rake bolt 78 is reduced, and thus, the clamping force is reduced or released, and, as a result, the resistance against telescoping movement between the upper jacket 42 and lower jacket 44 is reduced or released. However, the column jacket 36 remains held against movement in rake direction due to the engagement of the impact rake lock extensions 94 in the rake slots 32, 34. The steering column 20 is in the energy absorbing condition with extension lock teeth 96 engaging the rake lock teeth 98.

The axial load exceeding the predetermined load causes the capsules 102 to break away, allowing for movement of the mounting bracket 22 relative to the vehicle structure. In an exemplary embodiment, the mounting bracket 22 moves together with the upper jacket 42, compression bracket 64 and rake bolt 78 relative to the lower jacket 44. The mounting bracket 22 is driven the first direction D1 by the rake bolt 78 moving together with the upper jacket 42. Movement of mounting bracket 22 together with the upper jacket 42, compression bracket 64 and rake bolt 78 is controlled by the E/A straps 74, 76 connected to the mounting flanges 26, 30 of the mounting bracket 22, to absorb energy in the steering column in the high-impact or crash scenario.

In the exemplary embodiments above, when switching from the adjustable condition to an energy absorbing condition, upon application of an axial force that exceeds a predetermined force, the steering column, and in particular, the upper jacket 42 does not work against a resistance from the first clamping force along the rake bolt 78, as the clamping force is released or reduced by the release mechanism 52 during a transition from the adjustable condition to the energy absorbing condition. In particular, because the first clamping force is released or reduced, the upper jacket 42 does not work against the resistance from the first clamping force when moving telescopically relative to the lower jacket 44. Rather, the upper jacket 42 works against a resistance from the E/A straps 74, 76. Thus, the clamp force is decoupled from an energy absorbing resistance force.

Figure 6:
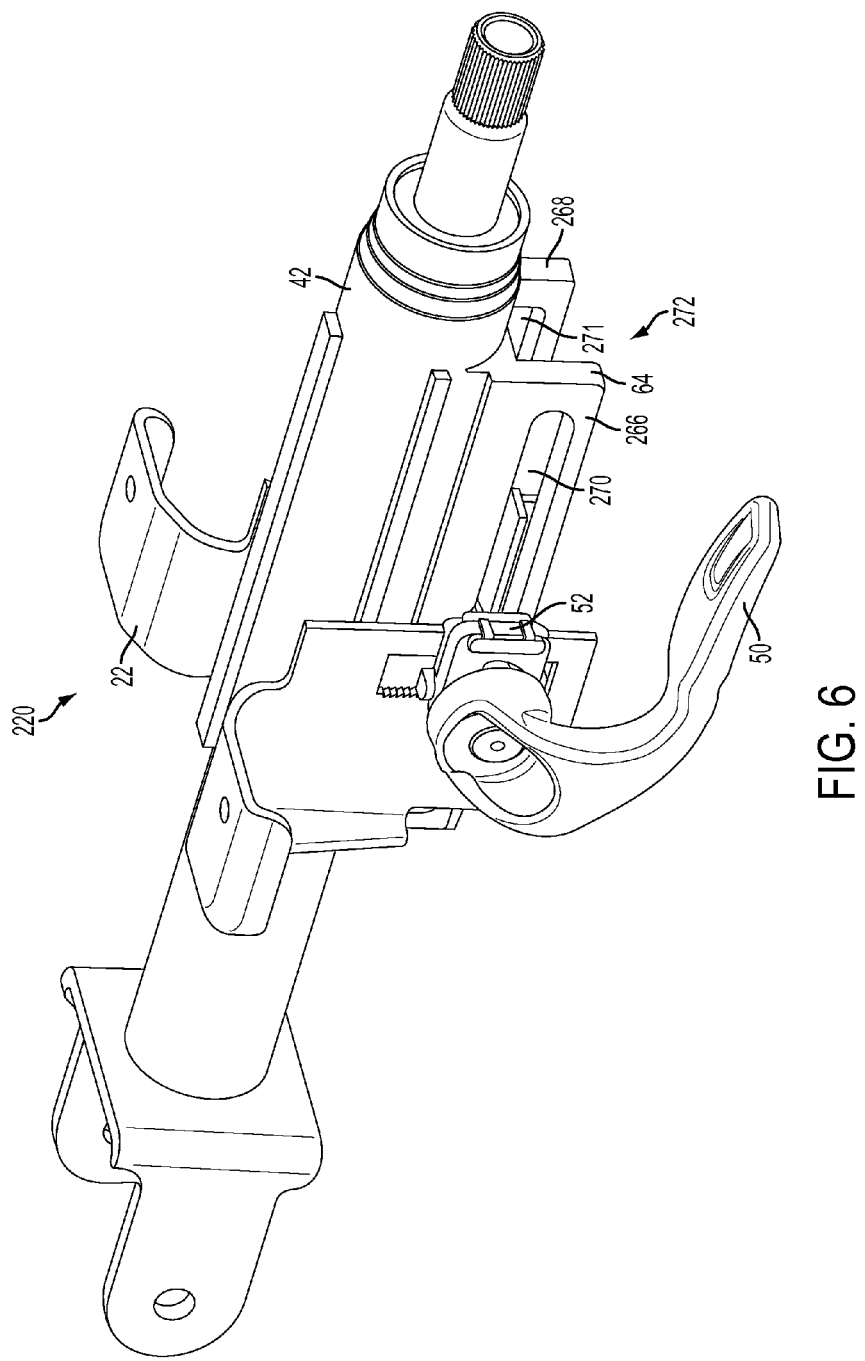
FIG. 6 is a perspective view of an adjustable steering column according to another exemplary embodiment of the present invention.
Figure 7:
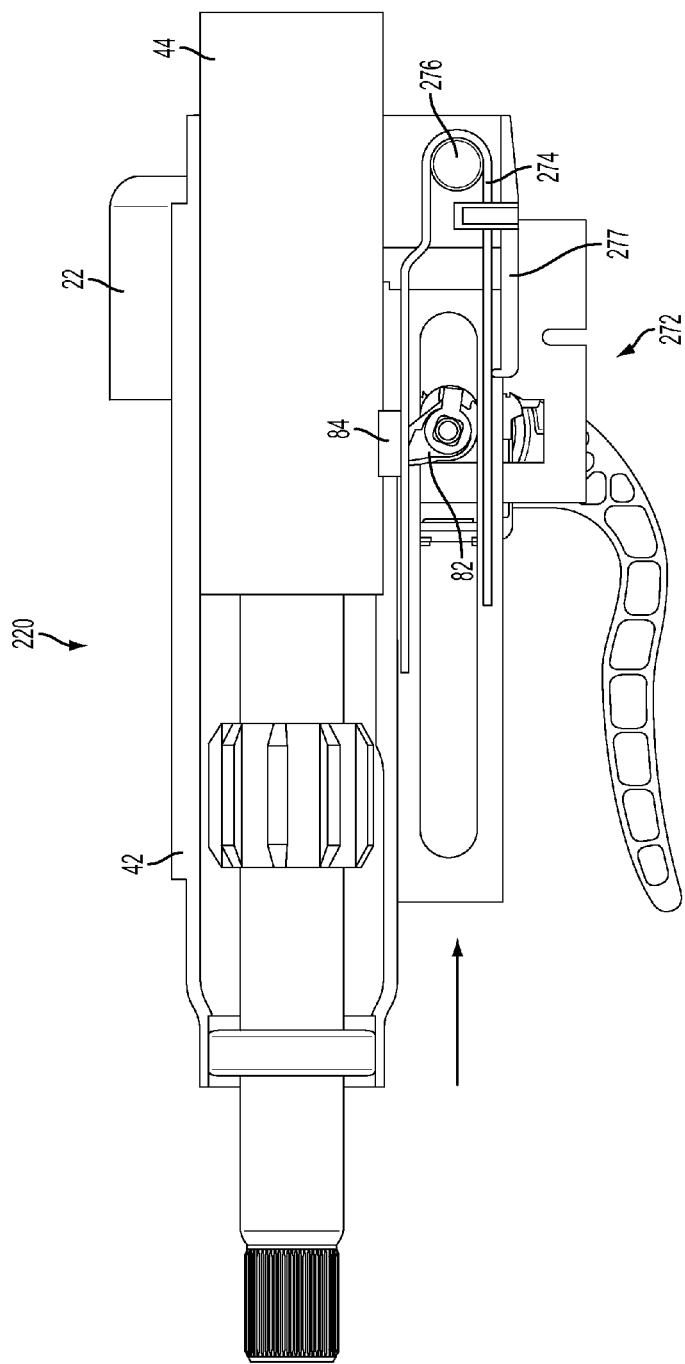
FIG. 7 is a side cross sectional view of the adjustable steering column of FIG. 6 according to an exemplary embodiment of the present invention.

FIGS. 6 and 7 show an alternative embodiment of the present invention. FIG. 6 is a perspective view of an adjustable steering column according the alternative exemplary embodiment of the present invention and FIG. 7 is a side cross sectional view of the adjustable steering column of FIG. 6. In this exemplary embodiment, parts and features similar to those described above will be referenced with the same terminology and reference numbers.

Referring to FIGS. 6 and 7, an adjustable steering column 220 includes an energy absorbing (E/A) mechanism 272 connected to the upper jacket 42 and compression bracket 64. The upper jacket 42 and compression bracket 64 may be formed as an integral unit, or formed separately and secured together, for example, by welding. The compression bracket 64 includes first and second inner legs 266, 268, the first leg 266 having a first telescope slot 270 and the second leg having a second telescope slot 271. The first and second telescope slots 270, 271 are of an increased length, sufficient to allow for telescope collapse of the steering column 220 in a high-impact or crash scenario.

Referring to FIG. 7, the E/A mechanism includes at least one E/A strap 274 mounted below the upper jacket 42 and restrained by the lock body 82 to the lower jacket 44. The corresponding locking segment 84 which the lock body engages is secured on the lower jacket 44. In a high-impact or crash event, the upper jacket 42 moves forward in the first direction D1 relative to the lower jacket 44, thereby forcing the E/A strap 274 to be pulled around a retaining pin 276 fixed to the upper jacket 42. The E/A strap 274 is also supported by a strap retainer 277 also fixed to the upper jacket 42.

In operation, the steering column operates in the adjustable and energy absorbing conditions as described above with reference to FIGS. 1-5 with the exception of the positioning and function of the E/A mechanism 272. Upon application of an axial force exceeding a predetermined force, the release mechanism 52 releases the first clamping force as described above. However, in this exemplary embodiment, the upper jacket 42, rather than the mounting bracket 22, moves within telescope slots 170 and 171 relative to mounting bracket 22, which remains stationary.

Accordingly, in this exemplary embodiment, the mounting bracket 22 may be secured and stationary in the vehicle in both the adjustable and energy absorbing conditions. During a high-impact or crash scenario, the upper jacket may move in the first direction D1 relative to the mounting bracket 22, rake bolt 78 and lower jacket 44 against a resistance from the at least one E/A strap 274.

In the exemplary embodiments above, the terminology "adjustment condition" generally refers to a condition where the adjustable steering column 20 may be selectively adjusted. In the adjustment condition, the locking mechanism may be moved to a locked position to restrict adjustment of the steering column, and in particular, the upper jacket 42 relative to the lower jacket 44 in the telescope direction. In the unlocked position of the locking mechanism 80, an operator may adjust the relative telescoping positions of the upper and lower jackets 42, 44.

The terminology "energy absorbing condition" generally refers to a condition of the steering column in a high-impact or crash scenario and an excessive axial force has been applied to the column jacket, and in particular 26, the upper jacket 42, for example, from a passenger being forced into contact with the steering column from high-impact or crash. In the energy absorbing condition, the locking mechanism is in the locked position and resists telescoping adjustment of the upper jacket 42 relative to the lower jacket 44. However, relative axial movement may permitted due to operation of the release mechanism when the excessive axial force is applied as described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column for a vehicle, the adjustable steering column comprising:
   a mounting bracket configured to be secured to an adjacent vehicle component, the mounting bracket comprising a first leg and a second leg;
   a compression bracket extending between the first leg and the second leg and movably positioned relative to the mounting bracket;
   a column jacket extending along a first axis comprising an upper jacket and a lower jacket telescopically coupled to one another, the column jacket adjustable in a telescope direction and a rake direction;
   a locking mechanism movable between a locked position and an unlocked position configured to selectively restrict adjustment of the upper jacket in the telescope direction relative to the lower jacket;
   at least one release mechanism configured to allow telescoping movement of the upper jacket relative to the lower jacket with the locking mechanism in the locked position in response to an axial force applied to the column jacket that exceeds a predetermined force; and
   at least one energy absorbing mechanism configured to absorb energy during telescoping movement of the upper jacket relative to the lower jacket with the locking mechanism in the locked position;
   a rake bolt extending along a second axis, the rake bolt extending through the mounting bracket and compression bracket;
   an operating lever operably connected to the rake bolt and configured to rotate the rake bolt on the second axis, the first leg including a first rake slot and the second leg including a second rake slot, the rake bolt extending through the first rake slot and second rake slot, the compression bracket further comprising a first inner leg and a second inner leg, the first inner leg comprising a first telescope slot and the second inner leg including a second telescope slot, the rake bolt extending through the first telescope slot and the second telescope slot;
   the at least one release mechanism comprises:
   an inner wedge secured to one of the first and second legs and having an inner wedge angled contact surface;
   an outer wedge having an outer wedge angled contact surface abutting the inner wedge angled contact surface, an impact rake lock extension, and an opening, the inner wedge angled contact surface and outer wedge angled contact surface forming a contact line that converges toward the first axis in direction from in first end of the column jacket to a second end of the column jacket; and
   a retainer extending through the opening and abutting the inner wedge, the retainer configured to break away in response to the axial force exceeding the predetermined force.

2. The adjustable steering column of claim 1, wherein the locking mechanism comprises a lock body positioned on, and rotatable with, the rake bolt, and a corresponding locking segment fixedly positioned on the compression bracket, wherein rotation of the rake bolt moves the lock body between the locked position and unlocked position of the locking mechanism.

3. The adjustable steering column of claim 1, wherein the inner wedge includes an elongated slot through which the rake bolt extends, and the outer wedge is non-rotatably connected to the rake bolt.

4. The adjustable steering column of claim 3, wherein the outer wedge is movable with the rake bolt in a first direction relative to the inner wedge upon breaking away of the retainer, and the rake bolt moves within the elongated slot.

5. The adjustable steering column of claim 4, wherein the impact rake lock extension of the outer wedge includes a plurality of extension lock teeth, and the rake slot of the outer leg to which the inner wedge is secured includes corresponding rake lock teeth, and the extension lock teeth move into locking engagement with the rake slot teeth in response to movement of the outer wedge in the first direction relative to the inner wedge.

6. The adjustable steering column of claim 5, wherein movement of the outer wedge relative to the inner wedge reduces a combined thickness of the outer wedge and inner wedge at the rake bolt, such that a clamping force applied to the mounting bracket, compression bracket, upper jacket, and lower jacket is released.

7. The adjustable steering column of claim 6, wherein the at least one release mechanism includes a second release mechanism positioned adjacent to the other of the first and second legs.

8. The adjustable steering column claim 7, wherein the mounting bracket includes a first mounting flange extending from the first leg and a second mounting flange extending from the second leg, and the at least one energy absorbing mechanism includes a first energy absorbing (E/A) strap connected to the first mounting flange and a second (E/A) strap connected to the second mounting flange.

9. The adjustable steering column of claim 8, wherein the mounting bracket, compression bracket and upper jacket move together against resistance of the first and second (E/A) straps.

10. The adjustable steering column of claim 7, wherein the upper jacket is secured to the compression bracket and the at least one energy absorbing (E/A) mechanism comprises an energy absorbing (E/A) strap secured around a retaining pin on the compression bracket or upper jacket and extending toward the first end of the column jacket.

11. The adjustable steering column of claim 10, wherein in response to breaking away of the retainer, the compression bracket and upper jacket move in the telescope direction relative to the mounting bracket against a resistance from the (E/A) strap which is pulled around the retaining pin.

12. An adjustable steering column for a vehicle, the adjustable steering column comprising:
   a mounting bracket configured to be secured to an adjacent vehicle component, the mounting bracket comprising a first leg and a second leg;
   a compression bracket extending between the first leg and the second leg and movably positioned relative to the mounting bracket;
   a column jacket extending along a first axis comprising an upper jacket and a lower jacket telescopically coupled to one another, the column jacket adjustable in a telescope direction and a rake direction;
   a locking mechanism movable between a locked position and an unlocked position configured to selectively restrict adjustment of the upper jacket in the telescope direction relative to the lower jacket;
   at least one release mechanism configured to allow telescoping movement of the upper jacket relative to the lower jacket with the locking mechanism in the locked position in response to an axial force applied to the column jacket that exceeds a predetermined force, the at least one release mechanism further including an inner wedge secured to one of the first and second legs and having an inner wedge angled contact surface; an outer wedge having an outer wedge angled contact surface abutting the inner wedge angled contact surface, an impact rake lock extension, and an opening, the inner wedge angled contact surface and outer wedge angled contact surface forming a contact line that converges toward the first axis in direction from in first end of the column jacket to a second end of the column jacket; and a retainer extending through the opening and abutting the inner wedge, the retainer configured to break away in response to the axial force exceeding the predetermined force; and at least one energy absorbing mechanism configured to absorb energy during telescoping movement of the upper jacket relative to the lower jacket with the locking mechanism in the locked position.

13. The adjustable steering column of claim 12, further comprising a rake bolt extending along a second axis, the rake bolt extending through the mounting bracket and compression bracket.

14. The adjustable steering column of claim 13, further comprising an operating lever operably connected to the rake bolt and configured to rotate the rake bolt on the second axis.

\* \* \* \* \*